United States Patent [19]
Leone et al.

[11] Patent Number: 5,838,845
[45] Date of Patent: Nov. 17, 1998

[54] PRIMARY STAGE OPTICAL SWITCH ASSEMBLY FOR AN OPTICAL FIBER ADMINISTRATION SYSTEM

[75] Inventors: Frank Salvatore Leone, Berkeley Heights; Richard Joseph Pimpinella, Hampton; Randy Alan Reagan, Morris Plains, Morris County, all of N.J.

[73] Assignee: Lucent Technologies Inc., Murray Hill, N.J.

[21] Appl. No.: 709,976

[22] Filed: Sep. 9, 1996

[51] Int. Cl.$^6$ ............................... G02B 6/26; G02B 6/42
[52] U.S. Cl. .............................................................. 385/16
[58] Field of Search .................................... 385/135, 136, 385/138, 139, 147, 902, 123, 16; 359/141

[56] References Cited

U.S. PATENT DOCUMENTS

| | | | |
|---|---|---|---|
| 4,922,236 | 5/1990 | Heady | 345/166 |
| 5,040,168 | 8/1991 | Maue et al. | 359/115 |
| 5,204,925 | 4/1993 | Bonanni et al. | 385/89 |
| 5,299,113 | 3/1994 | England et al. | 364/115 |
| 5,448,675 | 9/1995 | Leone et al. | 385/135 |
| 5,461,693 | 10/1995 | Pimpinella | 385/135 |
| 5,525,190 | 6/1996 | Wojnarowski et al. | 385/133 |
| 5,562,838 | 10/1996 | Wojnarowski et al. | 385/14 |

*Primary Examiner*—Akm E. Ullah

[57] ABSTRACT

A primary stage optical switch assembly that is used in an optical fiber administration system where various levels of switching are used to interconnect an optical time domain reflectometer (OTDR) to individual optical fibers. The primary stage optical switch assembly contains an optical switch and a connector array disposed within a shelf structure. The shelf structure is sized to mount into one of the bays in the framework of the fiber administration system. The optical switch contained within the primary stage optical switch assembly is fabricated from electronic components and optical components. Most of the electronic components are manufactured as part of an electronic module. The optical components are manufactured as part of a separate optical module. Both modules mount within the shelf structure. However, the electronic module can be removed from the shelf structure without effecting the position of the optics module or the optical leads that extend from the optical module.

15 Claims, 3 Drawing Sheets

PRIMARY STAGE OPTICAL SWITCH ASSEMBLY FOR AN OPTICAL FIBER ADMINISTRATION SYSTEM

RELATED APPLICATIONS

This application is related to the following:

U.S. patent application Ser. No. 08/713,576, entitled OPTICAL FIBER DISTRIBUTION SHELF ASSEMBLY CONTAINING A MODULAR OPTICAL SWITCH, filed Sep. 9, 1996;

U.S. patent application Ser. No. 08/645,108, entitled AN OPTICAL COMMUNICATIONS SYSTEM HAVING DISTRIBUTED INTELLIGENCE, filed May 13, 1996; and U.S. patent application Ser. No. 08/709,978, entitled FIBER OPTIC OPERATION CENTER, filed Sep. 9, 1996.

These applications are herein incorporated into this disclosure by reference.

BACKGROUND OF THE INVENTION

1. Field of the Invention

The present invention relates to a first stage optical switch used to connect optical fibers at a central office to an optical time domain reflectometer in an optical fiber administration system.

2. Description of the Prior Art

There are many applications that utilize an optical fiber network to establish optical communications between a host digital terminal (HDT) at a central office and an optical network unit (ONU) at a remote location. Since a central office serves as the point of origin for the optical fibers in the optical fiber network, fiber administration systems are typically used at the central office to manage the flow of optical signals as they are directed to the various ONUs along the different optical fibers in the network.

In many fiber administration systems, as the optical fibers in a network enter the central office, they are directed into an optical distribution frame where the individual optical fibers are terminated in an organized manner. Such fiber administration systems are exemplified by the LGX® fiber administration system which is currently manufactured by Lucent Technologies of Murray Hill, N.J., the assignee herein. In such fiber administration systems, the optical distribution frames used at the central office are typically large structures that are arranged in parallel rows. Each optical distribution frame is commonly mounted between the floor and ceiling and only a few feet separate each row of frames.

Each optical distribution frame located at the central office typically defines a plurality of bays, wherein each bay houses several fiber distribution shelves. On each of the fiber distribution shelves are connection modules that receive the ends of all of the individual optical fibers that enter the central office and are contained within the optical fiber network. By terminating each optical fiber at a connection module on one of the different fiber distribution shelves, the location of each optical fiber becomes known within the overall assembly. Once terminated at a known address on one of the fiber distribution shelves, each optical fiber can be selectively coupled to a HDT or a variety of other optical equipment located at the central office. As a result, the optical signals sent along each optical fiber can be selectively controlled.

In order to maintain the quality and integrity of the fiber administration system, the various optical fibers and connections that make up the fiber administration system must be periodically tested. Since a fiber administration system contains at least one optical fiber distribution frame, a first plurality of bays in each frame, a second plurality of fiber distribution shelves on each bay and a third plurality of fiber connection modules on each shelf, multiple levels of switching must occur before a test signal can be directed to a specific optical fiber line.

Since different levels of switching are required to direct a test signal to a single optical fiber, multiple optical switches must be provided within the confines of the framework that defines the fiber administration system. In the prior art, commercially available "off-the-shelf" optical switches are often placed within the frame of the fiber administration system. However, such commercial optical switches do not always integrate well with the architecture of the fiber administration system. For instance, a commercial optical switch may not physically fit well into a framework bay or into a bay shelf. Furthermore, the programming that runs the commercial optical switch may not be compatible with the central controller of the fiber administration system. Consequently, special programming or expensive interface modules are required in order to interconnect the commercial optical switch with the fiber administration system. Additionally, commercial optical switches are generally designed to be free standing. As a result, they come with their own power transformers and are often set in large bulky housings. Such features are not necessary in an optical switch that is part of an integrated fiber administration system. As a result, commercial optical switches take more room than is necessary when joined to a fiber administration system. This causes many logistical problems within the system framework where the amount of free space is greatly limited.

Another problem associated with commercially available optical switches is that of reliability and maintenance. In many models of commercially available optical switches, in order to repair the optical switch, all optical leads leading to the optical switch have to be disconnected and the optical switch housing has to be removed. If such a commercially available optical switch were made part of a fiber administration system, the optical switch would most likely have to be removed from the system framework before repairs could be made. As a result, a great deal of care must be made to disconnect the optical leads and identify the location of the optical leads for when they are replaced. This adds significantly to the time required to remove, repair and/or replace such an optical switch.

A need therefore exists in the art for an optical switch that is designed to be an integrated part of a fiber administration system, wherein the optical switch is compatible with the central controller of the fiber administration system and does not contain unnecessary components that add to the size of the optical switch.

A need also exist for an optical switch that integrates into the fiber administration system in a space efficient manner in regard to its physical presence and can be repaired without having to either remove the entire optical switch from the system frame or disconnect the optical leads joining to the optical switch.

SUMMARY OF THE INVENTION

The present invention is a primary stage optical switch assembly that is used in an optical fiber administration system where various levels of switching are used to interconnect an optical time domain reflectometer (OTDR) to individual optical fibers. The optical switch contained within the primary stage optical switch is coupled directly to the OTDR. The primary stage optical switch assembly selectively couples the OTDR to bay optical switches located at every bay in the framework of the optical fiber administration system. Each bay optical switch selectively couples the OTDR to a shelf optical switch that is part of each fiber distribution shelf. Each shelf optical switch therein selectively couples the OTDR to the optical fibers that terminate on that shelf.

The primary stage optical switch assembly contains an optical switch and a connector array disposed within a shelf structure. The shelf structure is sized to mount into one of the bays in the framework of the fiber administration system. The optical switch contained within the primary stage optical switch assembly is fabricated from electronic components and optical components. Most of the electronic components are manufactured as part of an electronic module. The optical components are manufactured as part of a separate optical module. Both modules mount within the shelf structure. However, the electronic module can be removed from the shelf structure without affecting the position of the optics module or the optical leads that extend from the optical module.

BRIEF DESCRIPTION OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Figure 1:
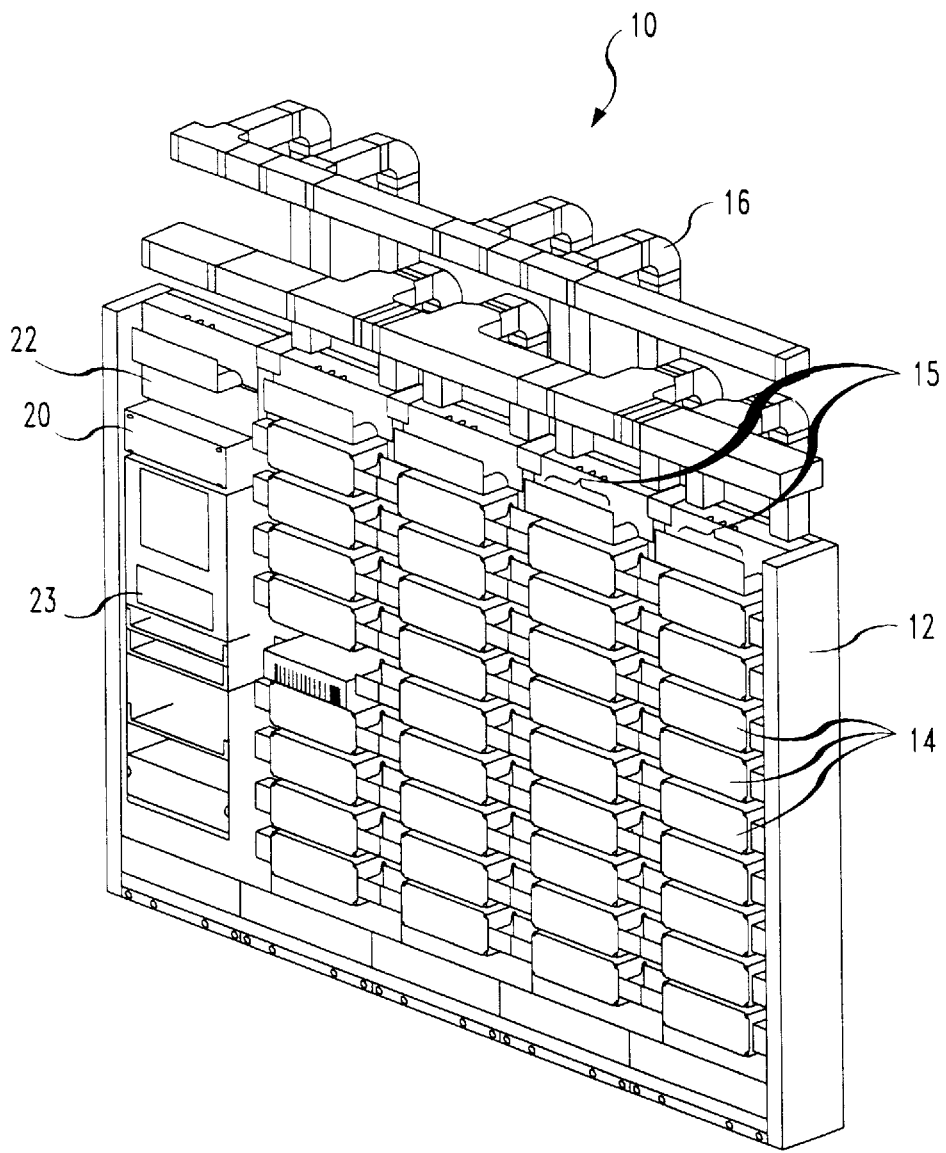
FIG. 1 is a perspective view of an optical fiber administration system containing a first plurality of bays and a second plurality of fiber distribution shelves in each bay.

In FIG. 1, a fiber administration system 10 is shown. Such administration systems are exemplified by the disclosures of U.S. Pat. application Ser. No. 08/645,108, entitled AN OPTICAL COMMUNICATIONS SYSTEM HAVING DISTRIBUTED INTELLIGENCE, filed May 13, 1996, and U.S. patent application Ser. No. 08/709,978, entitled FIBER OPTIC OPERATION CENTER, filed Sep. 9, 1996. The exemplary fiber administration system 10 includes an optical fiber distribution frame 12 that is affixed in a set position to the floor of a central office. The fiber distribution frame 12 defines a plurality of bays 15. Each bay 15 is a vertical structure that supports a plurality of fiber distribution shelves 14. The fiber distribution shelves 14 come in one of the three standard sizes, having a five inch height, a seven inch height or a nine inch height. A network of conduits 16 lead the various optical fibers from the optical fiber network to the fiber distribution shelves 14.

Contained within the framework of the optical fiber administration system 10 is an optical time domain reflectometer (OTDR) 20 that is used in the testing of the various optical fibers that are part of the fiber administration system 10. The OTDR 20 is coupled to a primary stage optical switch assembly 22 that is contained on one shelf within the framework of the fiber administration system 10. The primary stage optical switch assembly 22 contains a relational optical switch that maps an input signal to output ports as a function of an externally applied control signal supplied by a central systems controller 23. The optical switch contained within the primary stage optical switch assembly 22 is provided as a part of a remote fiber test system (RFTS) for directing test signals from the OTDR 20 to the optical fibers under test.

Figure 2:
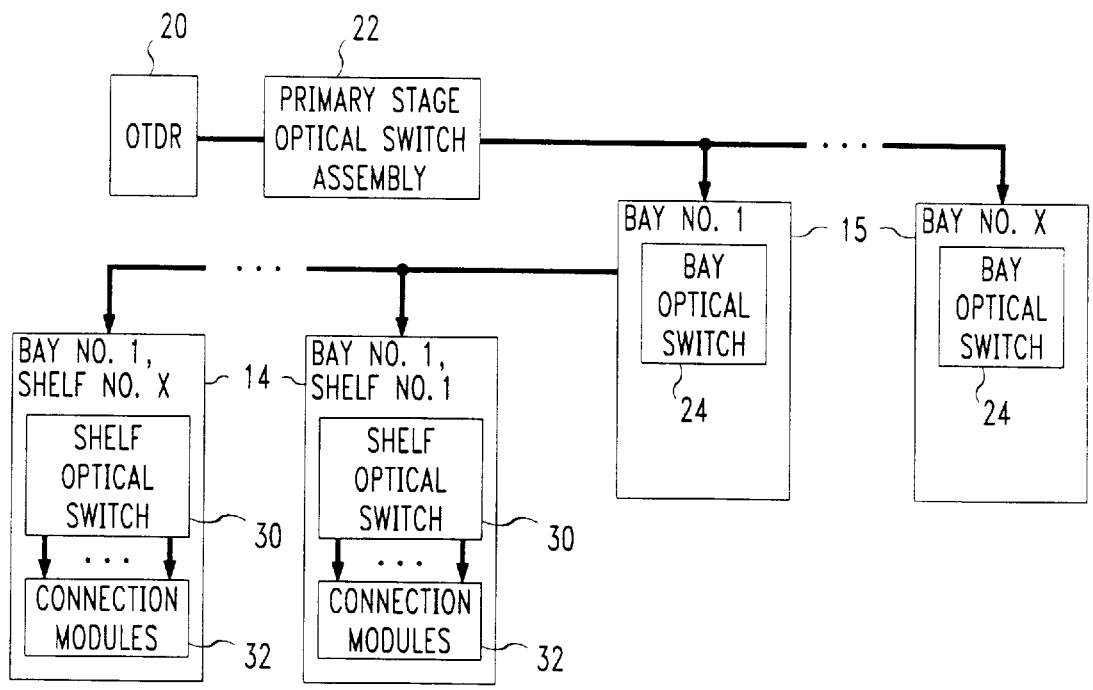
FIG. 2 is block diagram schematic showing the different levels of optical switching between an optical time domain reflectometer and the connection modules contained within the fiber administration system.

Referring to FIG. 2, it can be seen that the OTDR 20 is directly coupled to the primary stage optical switch assembly 22. The optical switch contained within the primary stage optical switch assembly 22 selectively interconnects the OTDR 20 with a bay optical switch 22 in each of the bays 15. The optical input to each of the bay optical switches 24 is coupled to one of the outputs of the primary stage optical switch assembly 22. Once a particular bay is coupled to the OTDR 20 by the primary stage optical switch assembly 22, then the bay optical switch 24 optically connects one of the fiber distribution shelves 14 contained within that bay to the primary stage optical switch assembly 22 and the OTDR 20.

Each of the fiber distribution shelves 14 present within each of the bays 15 contains a shelf optical switch 30. The optical input to each of the shelf optical switches 14 is coupled to one of the outputs of a bay optical switch 24. Once a particular shelf optical switch 24 is coupled to the OTDR 20, via a bay optical switch 24 and the primary stage optical switch assembly 22, then the targeted shelf optical switch 30 selects one of the connection modules 32 contained within that shelf. The selected connection module 32, therefore becomes optically connected to the OTDR 20, via the shelf optical switch 14, bay optical switch 24 and the primary optical switch assembly 22. Since each connection module 32 is coupled to an optical fiber that creates part of the overall optical network, by controlling the primary stage optical switch assembly 22, bay optical switches 24 and shelf optical switches 30, any optical fiber in the system can be coupled to the OTDR 20 for testing. The controlled switching that connects the OTDR 20 to each of the connection modules 20 can be done periodically as part of a repeating test diagnostic. Alternatively, the systems controller 23 (FIG. 1) can connect the OTDR 20 to any specific connection module as needed for specialized testing.

Figure 3:
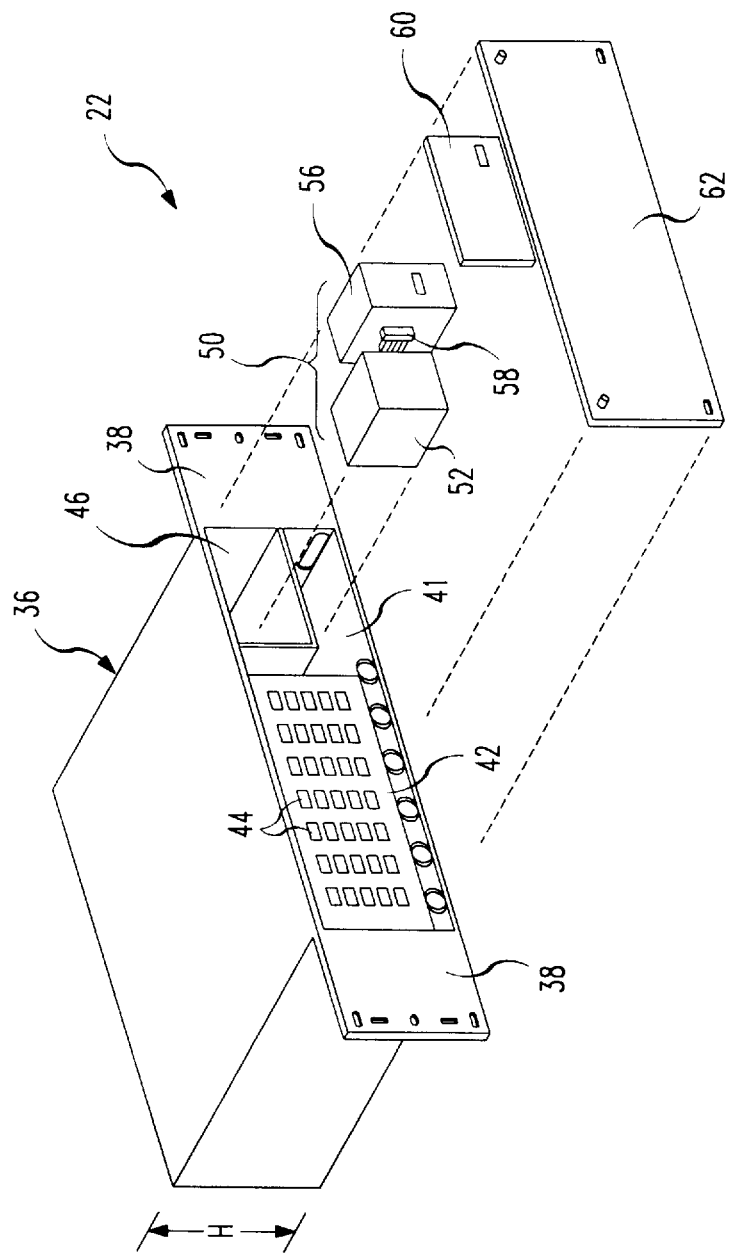
FIG. 3 is an exploded perspective view of an exemplary embodiment of a primary stage optical switch assembly in accordance with the present invention.

Referring to FIG. 3, the primary stage optical switch assembly 22 is shown. The primary stage optical switch assembly 22 is contained within a shelf structure 36. The shelf structure 36 is sized to fit within the framework of the overall optical fiber distribution system. Side mounting brackets 38 extend from the sides of the shelf structure 36. The side mounting brackets 38 enable the shelf structure 36 to be mounted to a bay 15 (FIG. 1) in the frame 12 (FIG. 1) of the optical fiber administration system 10 (FIG. 1). The shelf structure 36 has a height H that is either less than seven inches or less than nine inches so that the shelf structure can be seated in a space in a bay 15 (Fig.1) that is sized to receive either a standard seven inch shelf or a nine inch shelf, respectively.

The shelf structure 36 defines a primary open area 41 into which is mounted a connector array 42. The face of the connector array 42 contains a plurality of output connector ports 44. As will later be explained, the output leads of an optical switch terminate at the connector array 42, wherein each output connector port 44 is coupled to one output of the optical switch. As a result, an external optical lead can be joined to the optical switch of the primary stage optical switch assembly 22 by connecting the external optical lead to one of the output connector ports 44 on the connector array 42.

An internal compartment 46 is disposed within the confines of the larger shelf structure 36. The internal compartment 46 is sized to receive and retain an optical switch 50. The function of an optical switch is well known in the prior art and need not be set forth herein. However, in the shown embodiment, the optical switch 50 is divided into two distinct modules that lay side by side within the internal compartment 46. The first module is an optical switching module 52 that contains most of the fiber optics and optical circuitry common to an optical switch. The second module is an electronic control module 56 that controls the optical switching module 52. At least one male/female connector 58 is disposed between the electronic control module 56 and the optical switching module 52, wherein the male/female connector 58 interconnects the electronic control module 56 to the optical switching module 52 when both modules are placed within the internal compartment 46. Both the optical switching module 52 and the electronic control module 56 mount within the internal compartment 46. The male/female connector 58 is oriented in a manner that enables the electronic control module 56 to be removed from the internal compartment 46 without affecting the optical switching module 52. As a result, once the optical switching module 52 is mounted within the internal compartment 46, the electronic control module 56 can be either added to or removed from the internal compartment 46 without affecting the optical connections that lead to and from the optical switching module 52. Due to the orientation of the male/female connector 58, the electronic control module 56 automatically disengages from the optical switching module 52 when the electronic control module 56 is removed from the internal compartment 46. Conversely, the orientation of the male/female connector 58 automatically interconnects the electronic control module 56 to the optical switching module 52 when the optical switching module 52 is in place and the electronic control module 56 is added to the internal compartment 46. Although a male/female connector 58 is shown, it should be understood that any connection means could be used provided the connection means automatically creates an electrical interconnection in between the optical switching module 52 and the electronic control module 56 when placed next to one another within the internal compartment 46.

It is known in the art that many failures in optical switches occur because an electronic component fails within the optical switch. By providing an optical switch 50 with a removable electronic control module 56, the electronic control module 56 can be removed and replaced or fixed without having to remove the optical switching module 52. As a result, should an electronic component ever fail, the repair can be made without having to disconnect the optical leads that extend to and from the optical switching module 52. As a result, repairs can be performed with much less labor thereby resulting in a shorter period of time for the repair.

Once the electronic control module 56 and the optical switching module 52 are placed within the internal compartment 46, a cover plate 60 attaches over the face of the internal compartment 46 and helps to retain both modules in place. A shelf cover 62 then attaches over the face of the overall shelf structure 36, thereby protecting any optical fiber leads that connect to the front of the connector array 42. Organizing rings 63 are attached to the shelf structure 36 in front of the connector array 42. The organizing rings 63 organize and protect optical leads that lead to the output connector ports 44 on the connector array 42.

Figure 4:
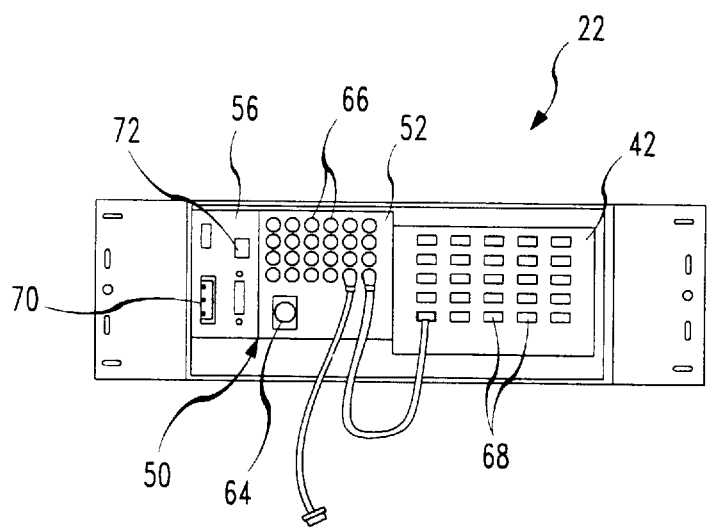
FIG. 4 is rear view of the embodiment set forth in FIG. 3.

Referring to FIG. 4, the rear of the primary stage optical switch assembly 50 is shown. From this view it can be seen that the rear of the optical switching module 52 contains at least one input connector port 64 and a plurality of output connector ports 66. The input connector port 64 connects to an optical lead that extends from the OTDR 20 (FIG. 2). The output connector ports 66 can be connected either directly to bay optical switches 24 (FIG. 2) with optical leads or can be coupled to the input ports 68 on the rear of the connector array 42.

On the rear of the electronic control module 56 is disposed a plurality of connector ports for coupling power and control signals to the optical switch 50. The main connector port 70 on the rear of the electronic control module 56 connects with the systems controller 23 (FIG. 1) of the overall fiber administration system. As such, the optical switch 50 can be directly controlled by the overall systems controller without the need for a separate interface module.

The optical switch 50 in the primary stage optical switch assembly 22 operates on power provided to the electronic control module 56 via a power connector port 72. Consequently, the primary stage optical switch assembly 22 is adapted to receive power directly from the overall fiber administration system and the single power supply that system possesses. Furthermore, by designing the primary stage optical switch assembly 22 so that it fits into a shelf structure, the primary stage optical switch assembly 22 can be readily added to the framework of a fiber administration system in a space efficient manner.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. An optical switch for use in an optical fiber administration system, wherein said optical switch includes electronic components and optical components, said optical switch comprising:

a shelf structure defining a confined space;

a compartment disposed within said confined space of said shelf structure;

an optical module mountable at a first position within said compartment, wherein said optical module contains most of said optical components;

an electronic module selectively mountable at a second position within said compartment, wherein said electronic module contains most of said electronic components;

wherein said electronic module can be selectively removed from said shelf structure without affecting the position of said optical module within said shelf structure.

2. The optical switch according to claim 1, further including a connector for electronically interconnecting said optical module and said electronic module when said optical module is at said first position and said electronic module is at said second position within said shelf structure.

3. The optical switch according to claim 1, wherein said optical module has multiple output ports and said optical switch further includes a connector array disposed within said shelf structure, wherein said connector array is optically coupled to said output ports of said optical module.

4. The optical switch according to claim 3 wherein each of said output ports of said optical module is coupled to a separate connector on said connector array with an optical lead.

5. The optical switch according to claim 1, further including mounting brackets affixed to said shelf structure for mounting said shelf structure to an external structure.

6. The optical switch according to claim 1, wherein said electronic module includes a control signal input port for receiving command signals from an external source.

7. The optical switch according to claim 1, wherein said electronic module includes a power input port for receiving electrical power from an external source.

8. In an optical fiber administration system having a frame structure that defines bays, wherein each of said bays contains a plurality of spaces adapted to receive shelf assemblies of a standard size, an optical switch assembly comprising:

a shelf structure no larger than said standard size, wherein said shelf structure is adapted to be received within one of said bays;

a optical switch containing electronic components and optical components, wherein said optical components are contained within an optical module that is mountable at a first position within said shelf structure and most of said electronic components are contained within a separate electronic module that is selectively mountable at a second position within said shelf structure;

wherein said electronic module can be selectively removed from said shelf structure without affecting the position of said optical module within said shelf structure.

9. The assembly according to claim 8, further including a connector for electronically interconnecting said optical module and said electronic module when said optical module is at said first position and said electronic module is at said second position within said shelf structure.

10. The assembly according to claim 8, wherein said optical module has multiple output ports and said optical switch further includes a connector array disposed within said shelf structure, wherein said connector array is optically coupled to said output ports of said optical module.

11. The assembly according to claim 10, wherein each of said output ports of said optical module is coupled to a separate connector on said connector array with an optical lead.

12. A method of manufacturing a primary stage optical switch assembly for use in an optical fiber administration system that contains an optical time domain reflectometer and a frame structure that defines bays, wherein each of said bays is configured to retain at least one shelf structure therein, said method comprising the steps of:

providing a shelf structure adapted to be mounted to one of said bays in said frame structure;

providing an optical switch having electronic components and optical components, wherein a majority of said electronic components are assembled in an electronic module and a majority of said optical components are assembled in a separate optical module;

mounting said optical module in a first position within said shelf structure;

mounting said electronic module in a second position within said shelf structure; and electronically interconnecting said optical module and said electronic module within said shelf structure to form an operational optical switch, wherein said electronic module can be selectively removed from said shelf structure without affecting the position of said optical module within said shelf structure.

13. The method according to claim 12, further including the step of providing a connector in between said electronic module and said optical module for electronically interconnecting said optical module and said electronic module when said optical module is at said first position and said electronic module is at said second position within said shelf structure.

14. The method according to claim 12, wherein said optical module has multiple output ports and said method further includes the step of providing a connector array within said shelf structure and optically coupling said connector array to said output ports of said optical module.

15. The method according to claim 12 wherein each of said output ports of said optical module is coupled to a separate connector on said connector array with an optical lead.

* * * * *